United States Patent
Gao et al.

(10) Patent No.: US 11,432,274 B2
(45) Date of Patent: Aug. 30, 2022

(54) DATA TRANSMISSION METHOD, USER EQUIPMENT, BASE STATION AND STORAGE MEDIUM

(71) Applicant: CHINA ACADEMY OF TELECOMMUNICATIONS TECHNOLOGY, Beijing (CN)

(72) Inventors: Xuejuan Gao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 161 days.

(21) Appl. No.: 16/764,829

(22) PCT Filed: Oct. 24, 2018

(86) PCT No.: PCT/CN2018/111610
§ 371 (c)(1),
(2) Date: May 15, 2020

(87) PCT Pub. No.: WO2019/095945
PCT Pub. Date: May 23, 2019

(65) Prior Publication Data
US 2020/0344728 A1 Oct. 29, 2020

(30) Foreign Application Priority Data
Nov. 17, 2017 (CN) .......................... 201711147406.2

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/1812* (2013.01); *H04L 5/0055* (2013.01);
(Continued)

(58) Field of Classification Search
CPC .......... H04W 72/042; H04W 72/0413; H04W 72/12; H04W 72/1289; H04W 72/0446;
(Continued)

(56) References Cited

U.S. PATENT DOCUMENTS

2015/0085814 A1 3/2015 Cai et al.
2015/0271798 A1 9/2015 Chen et al.
(Continued)

FOREIGN PATENT DOCUMENTS

| CN | 107294674 A | 10/2017 |
|---|---|---|
| JP | 2017515338 A | 6/2017 |
| WO | 2016106683 A | 7/2016 |

OTHER PUBLICATIONS

Notice of Reasons for Refusal from JP app. No. 2020-527789, dated Aug. 10, 2021 with English translation provided by global dossier, all pages.
(Continued)

*Primary Examiner* — Vinncelas Louis
(74) *Attorney, Agent, or Firm* — Ladas & Parry, LLP

(57) ABSTRACT

The present disclosure provides a data transmission method, a UE, a base station and a storage medium. The method includes: obtaining a slot format indication (SFI) transmitted by a base station; when a transmission direction of a preset transmission resource indicated by the SFI does not meet transmission requirement of downlink semi-persistent scheduling (SPS) transmission, not performing the transmission related to the downlink SPS transmission on the preset transmission resource; and/or, when a transmission direction of a preset transmission resource indicated by the SFI meets transmission requirement of downlink SPS transmission, performing the transmission related to the downlink SPS transmission on the preset transmission resource. The preset
(Continued)

transmitting a slot format indication (SFI) to a user equipment (UE) — S1510 when transmission direction of a preset transmission resource indicated by the SFI does not meet transmission requirement of downlink semi-persistent scheduling (SPS) transmission, determining that the UE does not perform transmission related to the downlink SPS transmission on the preset transmission resource; and/or, when the transmission direction of the preset transmission resource indicated by the SFI meets transmission requirement of downlink semi-persistent scheduling (SPS) transmission, determining that the UE perform transmission related to the downlink SPS transmission on the preset transmission resource — S1520 transmission resource is a resource for performing transmission related to the downlink SPS transmission.

16 Claims, 6 Drawing Sheets

(51) Int. Cl.
*H04L 5/00* (2006.01)
*H04W 72/12* (2009.01)

(52) U.S. Cl.
CPC ....... *H04W 72/0413* (2013.01); *H04W 72/12* (2013.01); *H04W 72/1289* (2013.01); *H04W 72/0446* (2013.01)

(58) Field of Classification Search
CPC ... H04W 52/146; H04L 1/1812; H04L 5/0055
See application file for complete search history.

(56) References Cited

U.S. PATENT DOCUMENTS

2017/0303250 A1    10/2017   Shao et al.
2019/0349167 A1    11/2019   Gao et al.
2020/0374048 A1*   11/2020   Lei .................... H04W 52/146

OTHER PUBLICATIONS

"Discussion on scheduling for SPS and UL waveform determination", R1-1717890, 3GPP TSG RAN WG1 Meeting 90bis, Prague, CZ, Oct. 9-13, 2017, all pages.
"On UE behaviour related to GC-PDCCH", R1-1712971, 3GPP TSG RAN WG1 Meeting #90, Prague, Czech Republic, Aug. 21-25, 2017.
"UE behavior for GC PDCCH", R1-1713680, 3GPP TSG RAN WG1 Meeting #90, Prague, P.R. Czechia, Aug. 21-25, 2017.
"UE behavior for group-common PDCCH", R1-1713936, 3GPP TSG RAN WG1 Meeting #90, Prague, Czechia, Aug. 21-25, 2017.
Extended European Search Report from EP app No. 18877371.7, dated Nov. 9, 2020.
"Offline discussion on GC-PDCCH carrying SFI", R1-1719172, 3GPP TSG RAN WG1 #90bis, Prague, Czech Republic, Oct. 9-13, 2017.
First Office Action from TW app. No. 107139132, dated May 31, 2020, with machine English translation.
International Search Report from PCT/CN2018/111610, dated Jan. 17, 2019, with English translation from WIPO.
Written Opinion of the International Searching Authority from PCT/CN2018/111610, dated Jan. 17, 2019, with English translation from WIPO.
International Preliminary Report on Patentability from PCT/CN2018/111610, dated May 19, 2020, with English translation from WIPO.

* cited by examiner

DATA TRANSMISSION METHOD, USER EQUIPMENT, BASE STATION AND STORAGE MEDIUM

CROSS-REFERENCE TO RELATED APPLICATIONS

This application is the U.S. national phase of PCT Application PCT/CN2018/111610 filed on Oct. 24, 2018, which claims the benefit and priority of Chinese Application No. 201711147406.2, filed on Nov. 17, 2017, the disclosures of which are incorporated herein by reference in their entireties.

TECHNICAL FIELD

The present disclosure relates to the field of wireless technologies, and in particular to a data transmission method, a user equipment, a base station and a storage medium.

BACKGROUND

With the development of mobile communication service requirements, organizations such as the International Telecommunication Union (ITU) and 3GPP have begun to research new wireless communication systems (such as 5 Generation New RAT, 5G NR). In the 5G NR, Slot Format Indication (SFI) can be used to change uplink and downlink ratio (slot formats) of one or more slots. The SFI may be transmitted on a Group Common physical downlink control channel (GC-PDCCH), or may be transmitted in a certain period, thereby dynamically changing uplink and downlink configuration of slots in the period.

The 5G NR further defines a downlink semi-persistent Scheduling (SPS) physical downlink shared channel (PDSCH) transmission. The so-called SPS PDSCH determines time domain position for transmission according to a pre-configured period. When PDCCH indicating activation of downlink SPS is received, transmission is performed according to scheduling information notified by the PDCCH, such as frequency domain resource and MCS level. When SFI is configured as well as the downlink SPS transmission is configured, the SFI may change transmission direction of resource at the time domain position corresponding to the downlink SPS transmission, for example, changing to uplink, and then how user equipment (UE) performs transmission has not been determined currently.

SUMMARY

One object of the technical solution of the present disclosure is to provide a data transmission method, a user equipment, a base station and a storage medium, which can solve the problem of data transmission when a base station simultaneously configures a slot format indication (SFI) and a downlink semi-persistent scheduling (SPS) physical downlink shared channel (PDSCH) transmission.

One embodiment of the present disclosure provides a data transmission method applied to a user equipment (UE), including:

obtaining a slot format indication (SFI) transmitted by a base station;

when a transmission direction of a preset transmission resource indicated by the SFI does not meet transmission requirement of downlink semi-persistent scheduling (SPS) transmission, not performing the transmission related to the downlink SPS transmission on the preset transmission resource; and/or, when a transmission direction of a preset transmission resource indicated by the SFI meets transmission requirement of downlink semi-persistent scheduling (SPS) transmission, performing the transmission related to the downlink SPS transmission on the preset transmission resource;

wherein the preset transmission resource is a resource for performing transmission related to the downlink SPS transmission.

Optionally, the transmission direction of the preset transmission resource indicated by the SFI not meeting transmission requirement of the downlink SPS transmission specifically includes:

when the transmission direction of the preset transmission resource indicated by the SFI is uplink, determining that the transmission direction of the preset transmission resource indicated by the SFI does not meet transmission requirement of the downlink SPS transmission, wherein the preset transmission resource is a resource for downlink SPS PDSCH transmission; and/or, when the transmission direction of the preset transmission resource indicated by the SFI is downlink, determining that the transmission direction of the preset transmission resource indicated by the SFI does not meet transmission requirement of the downlink SPS transmission, wherein the preset transmission resource is a resource for hybrid automatic repeat request-acknowledgement (HARQ-ACK) transmission corresponding to the downlink SPS PDSCH transmission.

Optionally, the transmission direction of the preset transmission resource indicated by the SFI meeting transmission requirement of the downlink SPS transmission specifically includes:

when the transmission direction of the preset transmission resource indicated by the SFI is downlink or unknown, determining that the transmission direction of the preset transmission resource indicated by the SFI meets transmission requirement of the downlink SPS transmission, wherein the preset transmission resource is a resource for downlink SPS PDSCH transmission; and/or, when the transmission direction of the preset transmission resource indicated by the SFI is uplink or unknown, determining that the transmission direction of the preset transmission resource indicated by the SFI meets transmission requirement of the downlink SPS transmission, wherein the preset transmission resource is a resource for hybrid automatic repeat request-acknowledgement (HARQ-ACK) transmission corresponding to the downlink SPS PDSCH transmission.

Optionally, the step of not performing the transmission related to the downlink SPS transmission on the preset transmission resource, includes: not receiving downlink SPS PDSCH transmission.

Optionally, the step of not performing the transmission related to the downlink SPS transmission on the preset transmission resource, includes: not performing HARQ-ACK transmission corresponding to the downlink SPS PDSCH transmission.

Optionally, the method further includes: when a resource for HARQ-ACK transmission corresponding to the downlink SPS PDSCH transmission, indicated by the SFI, is uplink or unknown, performing HARQ-ACK transmission corresponding to the downlink SPS PDSCH transmission with feedback information of NACK.

Optionally, the step of performing the transmission related to the downlink SPS transmission on the preset transmission resource, includes:
receiving downlink SPS PDSCH transmission; and/or,
performing HARQ-ACK transmission corresponding to the downlink SPS PDSCH transmission.

Optionally, the method further includes an execution condition for performing the data transmission method, and the execution condition includes: after the UE receives PDCCH for indicating activation of downlink SPS transmission, or after UE receives PDCCH for indicating activation of downlink SPS transmission until UE receives PDCCH for indicating release of the downlink SPS transmission.

One embodiment of the present disclosure provides a data transmission method applied to a base station, including:
transmitting a slot format indication (SFI) to a user equipment (UE);
when a transmission direction of a preset transmission resource indicated by the SFI does not meet transmission requirement of downlink semi-persistent scheduling (SPS) transmission, determining that the UE does not perform the transmission related to the downlink SPS transmission on the preset transmission resource; and/or,
when a transmission direction of a preset transmission resource indicated by the SFI meets transmission requirement of downlink semi-persistent scheduling (SPS) transmission, determining that the UE perform the transmission related to the downlink SPS transmission on the preset transmission resource;
wherein the preset transmission resource is a resource for performing transmission related to the downlink SPS transmission.

Optionally, the transmission direction of the preset transmission resource indicated by the SFI not meeting transmission requirement of the downlink SPS transmission specifically includes:
when the transmission direction of the preset transmission resource indicated by the SFI is uplink, determining that the transmission direction of the preset transmission resource indicated by the SFI does not meet transmission requirement of the downlink SPS transmission, wherein the preset transmission resource is a resource for downlink SPS PDSCH transmission; and/or,
when the transmission direction of the preset transmission resource indicated by the SFI is downlink, determining that the transmission direction of the preset transmission resource indicated by the SFI does not meet transmission requirement of the downlink SPS transmission, wherein the preset transmission resource is a resource for hybrid automatic repeat request-acknowledgement (HARQ-ACK) transmission corresponding to the downlink SPS PDSCH transmission.

Optionally, the transmission direction of the preset transmission resource indicated by the SFI meeting transmission requirement of the downlink SPS transmission specifically includes:
when the transmission direction of the preset transmission resource indicated by the SFI is downlink or unknown, determining that the transmission direction of the preset transmission resource indicated by the SFI meets transmission requirement of the downlink SPS transmission, wherein the preset transmission resource is a resource for downlink SPS PDSCH transmission; and/or,
when the transmission direction of the preset transmission resource indicated by the SFI is uplink or unknown, determining that the transmission direction of the preset transmission resource indicated by the SFI meets transmission requirement of the downlink SPS transmission, wherein the preset transmission resource is a resource for hybrid automatic repeat request-acknowledgement (HARQ-ACK) transmission corresponding to the downlink SPS PDSCH transmission.

Optionally, the step of determining that the UE does not perform the transmission related to the downlink SPS transmission on the preset transmission resource, includes: determining that the UE does not receive downlink SPS PDSCH transmission.

Optionally, the step of determining that the UE does not perform transmission related to the downlink SPS transmission on the preset transmission resource, includes: determining that the UE does not perform HARQ-ACK transmission corresponding to the downlink SPS PDSCH transmission.

Optionally, the method further includes: when a resource for HARQ-ACK transmission corresponding to the downlink SPS PDSCH transmission, indicated by the SFI, is uplink or unknown, determining that the UE performs HARQ-ACK transmission corresponding to the downlink SPS PDSCH transmission with feedback information of NACK.

Optionally, the step of determining that the UE performs the transmission related to the downlink SPS transmission on the preset transmission resource, includes:
determining that the UE receives downlink SPS PDSCH transmission; and/or,
determining that the UE performs HARQ-ACK transmission corresponding to the downlink SPS PDSCH transmission.

One embodiment of the present disclosure provides a user equipment (UE) including: a transceiver, a memory, a processor, and a computer program stored on the memory and executable on the processor; wherein the transceiver is configured to:
obtain a slot format indication (SFI) transmitted by a base station;
when a transmission direction of a preset transmission resource indicated by the SFI does not meet transmission requirement of downlink semi-persistent scheduling (SPS) transmission, not perform the transmission related to the downlink SPS transmission on the preset transmission resource; and/or,
when a transmission direction of a preset transmission resource indicated by the SFI meets transmission requirement of downlink semi-persistent scheduling (SPS) transmission, perform the transmission related to the downlink SPS transmission on the preset transmission resource;
wherein the preset transmission resource is a resource for performing transmission related to the downlink SPS transmission.

Optionally, the transmission direction of the preset transmission resource indicated by the SFI not meeting transmission requirement of the downlink SPS transmission specifically includes:
when the transmission direction of the preset transmission resource indicated by the SFI is uplink, determining that the transmission direction of the preset transmission resource indicated by the SFI does not meet transmission requirement of the downlink SPS transmission, wherein the preset transmission resource is a resource for downlink SPS PDSCH transmission; and/or,
when the transmission direction of the preset transmission resource indicated by the SFI is downlink, determining that the transmission direction of the preset transmission resource indicated by the SFI does not meet transmission requirement of the downlink SPS transmission, wherein the preset transmission resource is a resource for hybrid automatic repeat request-acknowledgement (HARQ-ACK) transmission corresponding to the downlink SPS PDSCH transmission.

Optionally, the transmission direction of the preset transmission resource indicated by the SFI meeting transmission requirement of the downlink SPS transmission specifically includes:

when the transmission direction of the preset transmission resource indicated by the SFI is downlink or unknown, determining that the transmission direction of the preset transmission resource indicated by the SFI meets transmission requirement of the downlink SPS transmission, wherein the preset transmission resource is a resource for downlink SPS PDSCH transmission; and/or, when the transmission direction of the preset transmission resource indicated by the SFI is uplink or unknown, determining that the transmission direction of the preset transmission resource indicated by the SFI meets transmission requirement of the downlink SPS transmission, wherein the preset transmission resource is a resource for hybrid automatic repeat request-acknowledgement (HARQ-ACK) transmission corresponding to the downlink SPS PDSCH transmission.

Optionally, the step of the transceiver not performing the transmission related to the downlink SPS transmission on the preset transmission resource, includes: not receiving downlink SPS PDSCH transmission.

Optionally, the step of the transceiver not performing the transmission related to the downlink SPS transmission on the preset transmission resource, further includes: not performing HARQ-ACK transmission corresponding to the downlink SPS PDSCH transmission.

Optionally, the transceiver is further configured to, when a resource for HARQ-ACK transmission corresponding to the downlink SPS PDSCH transmission, indicated by the SFI, is uplink or unknown, perform HARQ-ACK transmission corresponding to the downlink SPS PDSCH transmission with feedback information of NACK.

Optionally, the step of the transceiver performing the transmission related to the downlink SPS transmission on the preset transmission resource, includes:

receiving downlink SPS PDSCH transmission; and/or, performing HARQ-ACK transmission corresponding to the downlink SPS PDSCH transmission.

Optionally, an execution condition for the UE performing data transmission includes: after the UE receives PDCCH for indicating activation of downlink SPS transmission, or after UE receives PDCCH for indicating activation of downlink SPS transmission until UE receives PDCCH for indicating release of the downlink SPS transmission.

One embodiment of the present disclosure provides a base station including: a transceiver, a memory, a processor, and a computer program stored on the memory and executable on the processor;

wherein the transceiver is configured to transmit a slot format indication (SFI) to a user equipment (UE);

the processor is configured to, when a transmission direction of a preset transmission resource indicated by the SFI does not meet transmission requirement of downlink semi-persistent scheduling (SPS) transmission, determine that the UE does not perform the transmission related to the downlink SPS transmission on the preset transmission resource; and/or, when a transmission direction of a preset transmission resource indicated by the SFI meets transmission requirement of downlink semi-persistent scheduling (SPS) transmission, determine that the UE perform the transmission related to the downlink SPS transmission on the preset transmission resource;

wherein the preset transmission resource is a resource for performing transmission related to the downlink SPS transmission.

Optionally, the processor is configured to, when the transmission direction of the preset transmission resource indicated by the SFI is uplink, determine that the transmission direction of the preset transmission resource indicated by the SFI does not meet transmission requirement of the downlink SPS transmission, wherein the preset transmission resource is a resource for downlink SPS PDSCH transmission; and/or, when the transmission direction of the preset transmission resource indicated by the SFI is downlink, determine that the transmission direction of the preset transmission resource indicated by the SFI does not meet transmission requirement of the downlink SPS transmission, wherein the preset transmission resource is a resource for hybrid automatic repeat request-acknowledgement (HARQ-ACK) transmission corresponding to the downlink SPS PDSCH transmission.

Optionally, the processor is configured to, when the transmission direction of the preset transmission resource indicated by the SFI is downlink or unknown, determine that the transmission direction of the preset transmission resource indicated by the SFI meets transmission requirement of the downlink SPS transmission, wherein the preset transmission resource is a resource for downlink SPS PDSCH transmission; and/or, when the transmission direction of the preset transmission resource indicated by the SFI is uplink or unknown, determine that the transmission direction of the preset transmission resource indicated by the SFI meets transmission requirement of the downlink SPS transmission, wherein the preset transmission resource is a resource for hybrid automatic repeat request-acknowledgement (HARQ-ACK) transmission corresponding to the downlink SPS PDSCH transmission.

Optionally, when the processor determines that the UE does not perform the transmission related to the downlink SPS transmission on the preset transmission resource, the processor is specifically configured to, determine that the UE does not receive downlink SPS PDSCH transmission.

Optionally, when the processor determines that the UE does not perform the transmission related to the downlink SPS transmission on the preset transmission resource, the processor is specifically configured to, determine that the UE does not perform HARQ-ACK transmission corresponding to the downlink SPS PDSCH transmission.

Optionally, the processor is further configured to, when a resource for HARQ-ACK transmission corresponding to the downlink SPS PDSCH transmission, indicated by the SFI, is uplink or unknown, determine that the UE performs HARQ-ACK transmission corresponding to the downlink SPS PDSCH transmission with feedback information of NACK.

Optionally, when the processor determines that the UE performs the transmission related to the downlink SPS transmission on the preset transmission resource, the processor is specifically configured to, determine that the UE receives downlink SPS PDSCH transmission; and/or, determine that the UE performs HARQ-ACK transmission corresponding to the downlink SPS PDSCH transmission.

One embodiment of the present disclosure provides a user equipment (UE) including:

a first transceiver module, configured to obtain a slot format indication (SFI) transmitted by a base station;

a first transmission module configured to, when a transmission direction of a preset transmission resource indicated by the SFI does not meet transmission requirement of downlink semi-persistent scheduling (SPS) transmission, not perform the transmission related to the downlink SPS transmission on the preset transmission resource; and/or, a second transmission module configured to, when a transmission direction of a preset transmission resource indicated by the SFI meets transmission requirement of downlink semi-persistent scheduling (SPS) transmission, perform the transmission related to the downlink SPS transmission on the preset transmission resource;

wherein the preset transmission resource is a resource for performing transmission related to the downlink SPS transmission.

One embodiment of the present disclosure provides a base station including:

a second transceiver module configured to transmit a slot format indication (SFI) to a user equipment (UE);

a first processing module configured to, when a transmission direction of a preset transmission resource indicated by the SFI does not meet transmission requirement of downlink semi-persistent scheduling (SPS) transmission, determine that the UE does not perform the transmission related to the downlink SPS transmission on the preset transmission resource; and/or, a second processing module configured to, when a transmission direction of a preset transmission resource indicated by the SFI meets transmission requirement of downlink semi-persistent scheduling (SPS) transmission, determine that the UE perform the transmission related to the downlink SPS transmission on the preset transmission resource;

wherein the preset transmission resource is a resource for performing transmission related to the downlink SPS transmission.

One embodiment of the present disclosure provides a computer readable storage medium including a computer program stored thereon; wherein the computer program is executed by a processor to implement steps of the above data transmission method.

One or more embodiments of the present disclosure have at least the following beneficial effects:

The data transmission method according to the embodiment of the present disclosure clearly defines the data transmission mode when a direction of a resource corresponding to downlink SPS transmission determined by the SFI does not meet requirement of the downlink SPS transmission and/or meets the requirement of the downlink SPS transmission, thereby solving the problem of data transmission when the base station simultaneously configures the slot format indication (SFI) and the downlink semi-persistent scheduling (SPS) physical downlink shared channel (PDSCH) transmission, and then ensuring normal communication of UE and achieving the effect of saving power of UE.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
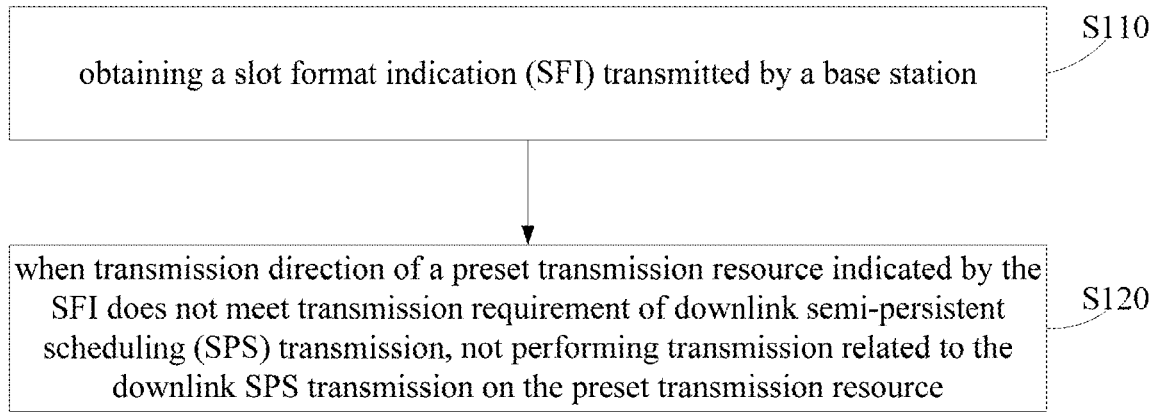
FIG. 1 is a flowchart of a data transmission method according to a first embodiment of the present disclosure.

The technical solution of embodiments of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

In order to make technical problems to be solved, technical solutions and the advantages of the present disclosure more apparent, the present disclosure will be described hereinafter in a clear and complete manner in conjunction with the drawings and embodiments. In the following description, specific configurations and specific details of components are provided only to assist in a comprehensive understanding of the embodiments of the present disclosure. Therefore, those skilled in the art should understand that various changes and modifications may be made to the embodiments described herein without departing from the scope and spirit of the present disclosure. In addition, descriptions of known functions and configurations are omitted for clarity and conciseness.

It should be understood that "an embodiment" or "one embodiment" mentioned throughout the specification means that specific features, structures or characteristics related to one embodiment are included in at least one embodiment of the present disclosure. Therefore, "in an embodiment" or "in one embodiment" appearing throughout the specification does not necessarily refer to the same embodiment. In addition, these specific features, structures or characteristics may be combined in any suitable manner in one or more embodiments.

In various embodiments of the present disclosure, it should be understood that sequence numbers of the following procedures do not mean execution orders, and execution orders of various procedures should be determined by their functions and inherent logic, and therefore the sequence numbers of the following procedures should not constitute any limitation on implementation process of the embodiments of the present disclosure.

In addition, the terms "system" and "network" are used interchangeably herein.

In embodiments of the present disclosure, it should be understood that "B corresponding to A" means that B is associated with A, and B can be determined according to A. However, it should also be understood that determining B according to A does not mean that B is determined only according to A, instead, B may also be determined according to A and/or other information.

In the embodiment of the present disclosure, the form of accessing network are not limited, and may access network through a macro base station, a pico base station, a Node B (which is the name of 3G mobile base station), an enhanced base station (eNB), a Femto eNB (Home eNode B, Home eNB, or HeNB), a relay station, an access point, a remote radio module (RRU), a remote radio head (RRH). User terminal may be a mobile phone (or cell phone), or other device capable of transmitting or receiving wireless signals, including user equipment (UE), personal digital assistant (PDA), wireless modem, wireless communication device, hand-held device, laptop computer, cordless phone, wireless local loop (WLL) station, customer premise equipment (CPE) capable of converting mobile signals into WiFi signals, mobile smart hotspot, smart home appliance, or other devices that can spontaneously communicate with the mobile communication network without human operation.

Specifically, one embodiment of the present disclosure provides a data transmission method, which can solve the problem of data transmission when a base station simultaneously configures a slot format indication (SFI) and a downlink semi-persistent scheduling (SPS) physical downlink shared channel (PDSCH) transmission, thereby ensuring normal communication of UE and achieving the effect of saving power of UE.

First Embodiment

Referring to FIG. 1, a data transmission method according to a first embodiment of the present disclosure, which is applied to a user equipment (UE), includes:

S110: obtaining a slot format indication (SFI) transmitted by a base station;

S120: when transmission direction of a preset transmission resource indicated by the SFI does not meet transmission requirement of downlink semi-persistent scheduling (SPS) transmission, not performing transmission related to the downlink SPS transmission on the preset transmission resource.

The preset transmission resource is a resource configured in advance for performing transmission related to the downlink SPS transmission.

In the data transmission method according to the first embodiment of the present disclosure, when transmission direction of a resource (preset transmission resource) used for performing transmission related to the downlink SPS transmission, indicated by the SFI, does not meet transmission requirement of the downlink SPS transmission, transmission related to the downlink SPS transmission is not performed on the preset transmission resource.

Specifically, in the step S120, transmission direction of the preset transmission resource indicated by the SFI not meeting transmission requirement of the downlink SPS transmission specifically includes:

when transmission direction of the preset transmission resource indicated by the SFI is uplink, determining that the transmission direction of the preset transmission resource indicated by the SFI does not meet the transmission requirement of the downlink SPS transmission, where the preset transmission resource is a resource used for downlink SPS PDSCH transmission; and/or, when transmission direction of the preset transmission resource indicated by the SFI is downlink, determining that the transmission direction of the preset transmission resource indicated by the SFI does not meet the transmission requirement of the downlink SPS transmission, where the preset transmission resource is a resource used for hybrid automatic repeat request-acknowledgement (HARQ-ACK) transmission corresponding to the downlink SPS PDSCH transmission.

Specifically, the resource used for downlink SPS PDSCH transmission is determined according to a pre-configured period of the downlink SPS transmission, and at least refers to a position in time domain, such as one or a combination of indexes of symbol, slot and sub-frame.

The resource used for HARQ-ACK transmission corresponding to the downlink SPS PDSCH transmission is determined according to HARQ-ACK timing indication field in PDCCH for indicating activation of the downlink SPS PDSCH, or, is determined according to HARQ-ACK timing which configured by high layer signaling or pre-defined by pre-agreement; and the resource at least refers to a position in time domain, such as one or a combination of indexes of symbol, slot and sub-frame.

Moreover, in the step S120, not performing transmission related to the downlink SPS transmission on the preset transmission resource includes:

not receiving downlink SPS PDSCH transmission, i.e., not receiving downlink SPS PDSCH on a resource for downlink SPS transmission corresponding to the preset transmission resource.

Further, in the step S120, not performing transmission related to the downlink SPS transmission on the preset transmission resource further includes:

not performing the HARQ-ACK transmission corresponding to the downlink SPS PDSCH transmission, i.e., not performing HARQ-ACK feedback corresponding to the downlink SPS transmission on a resource for feeding back HARQ-ACK corresponding to the preset transmission resource.

In another aspect of the specific embodiment of the present disclosure, when the preset transmission resource is a resource used for downlink SPS transmission determined according to a pre-configured period of the downlink SPS transmission, if transmission direction of the resource used for downlink SPS transmission indicated by the SFI is uplink, UE not receiving downlink SPS PDSCH transmission may further include:

when the resource used for HARQ-ACK transmission corresponding to the downlink SPS PDSCH transmission, indicated by the SFI, is uplink or unknown, performing HARQ-ACK transmission corresponding to the downlink SPS PDSCH transmission with feedback information of NACK.

On the other hand, preferably, based on the above embodiment, the step of not performing transmission related to the downlink SPS transmission on the preset transmission resource further includes:

before receiving the downlink SPS transmission, when UE receives the SFI transmitted by the base station and determines that a resource corresponding to HARQ-ACK feedback for the downlink SPS transmission indicated by the SFI is downlink, not receiving the downlink SPS transmission.

Second Embodiment

Figure 2:
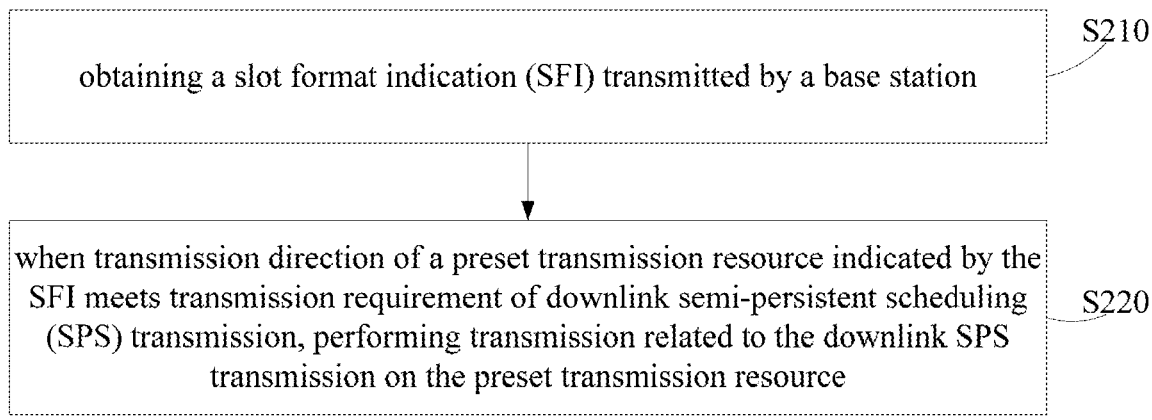
FIG. 2 is a flowchart of a data transmission method according to a second embodiment of the present disclosure.

Referring to FIG. 2, a data transmission method according to a second embodiment of the present disclosure, which is applied to a user equipment (UE), includes:

S210: obtaining a slot format indication (SFI) transmitted by a base station;

S220: when transmission direction of a preset transmission resource indicated by the SFI meets transmission requirement of downlink semi-persistent scheduling (SPS) transmission, performing transmission related to the downlink SPS transmission on the preset transmission resource.

The preset transmission resource is a resource used for performing transmission related to the downlink SPS transmission.

In the data transmission method according to the second embodiment of the present disclosure, when transmission direction of a resource (preset transmission resource) used for performing transmission related to the downlink SPS transmission, indicated by the SFI, meets transmission requirement of the downlink SPS transmission, transmission related to the downlink SPS transmission is performed on the preset transmission resource.

Specifically, in the step S220, transmission direction of the preset transmission resource indicated by the SFI meeting transmission requirement of the downlink SPS transmission specifically includes:

when transmission direction of the preset transmission resource indicated by the SFI is downlink or unknown, determining that the transmission direction of the preset transmission resource indicated by the SFI meets the transmission requirement of the downlink SPS transmission, where the preset transmission resource is a resource used for downlink SPS PDSCH transmission; and/or, when transmission direction of the preset transmission resource indicated by the SFI is uplink or unknown, determining that the transmission direction of the preset transmission resource indicated by the SFI meets the transmission requirement of the downlink SPS transmission, where the preset transmission resource is a resource used for hybrid automatic repeat request-acknowledgement (HARQ-ACK) transmission corresponding to the downlink SPS PDSCH transmission.

Moreover, in the step S220, performing transmission related to the downlink SPS transmission on the preset transmission resource includes:

receiving downlink SPS PDSCH transmission; and/or, performing the HARQ-ACK transmission corresponding to the downlink SPS PDSCH transmission.

Third Embodiment

Figure 3:
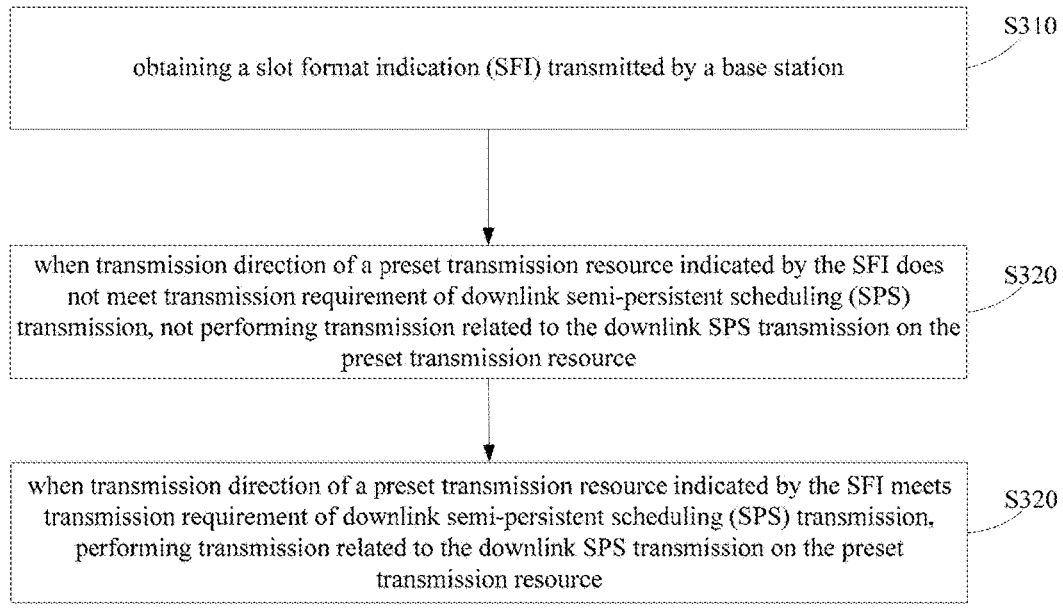
FIG. 3 is a flowchart of a data transmission method according to a third embodiment of the present disclosure.

Referring to FIG. 3, a data transmission method according to a third embodiment of the present disclosure, which is applied to a user equipment (UE), includes:

S310: obtaining a slot format indication (SFI) transmitted by a base station;

S320: when transmission direction of a preset transmission resource indicated by the SFI does not meet transmission requirement of downlink semi-persistent scheduling (SPS) transmission, not performing transmission related to the downlink SPS transmission on the preset transmission resource;

S330: when transmission direction of a preset transmission resource indicated by the SFI meets transmission requirement of downlink semi-persistent scheduling (SPS) transmission, performing transmission related to the downlink SPS transmission on the preset transmission resource.

The preset transmission resource is a resource used for performing transmission related to the downlink SPS transmission.

In the data transmission method according to the third embodiment of the present disclosure, when transmission direction of a resource (preset transmission resource) used for performing transmission related to the downlink SPS transmission, indicated by the SFI, meets transmission requirement of the downlink SPS transmission, transmission related to the downlink SPS transmission is performed on the preset transmission resource; when transmission direction of a resource (preset transmission resource) used for performing transmission related to the downlink SPS transmission, indicated by the SFI, does not meet transmission requirement of the downlink SPS transmission, transmission related to the downlink SPS transmission is not performed on the preset transmission resource.

In the third embodiment, whether the transmission direction of the preset transmission resource indicated by the SFI meets the transmission requirement of the downlink SPS transmission, the specific manner of not performing transmission related to the downlink SPS transmission on the preset transmission resource when transmission direction of the preset transmission resource indicated by the SFI does not meet transmission requirement of the downlink SPS transmission, and the specific manner of performing transmission related to the downlink SPS transmission on the preset transmission resource when transmission direction of the preset transmission resource indicated by the SFI meets transmission requirement of the downlink SPS transmission, may refer to the descriptions in the first embodiment and the second embodiment in conjunction with FIG. 1 and FIG. 2, which will not be described in detail herein.

In the first to third embodiments of the present disclosure, the execution condition of any of the above data transmission methods is that: after UE receives PDCCH for indicating activation of downlink SPS transmission, or after UE receives PDCCH for indicating activation of downlink SPS transmission until UE receives PDCCH for indicating release of the downlink SPS transmission.

The data transmission method according to any one of the first embodiment to the third embodiment of the present disclosure clearly defines the data transmission mode when a direction of a resource corresponding to downlink SPS transmission determined by the SFI does not meet requirement of the downlink SPS transmission and/or meets the requirement of the downlink SPS transmission, thereby solving the problem of data transmission when the base station simultaneously configures the slot format indication (SFI) and the downlink semi-persistent scheduling (SPS) physical downlink shared channel (PDSCH) transmission, and then ensuring normal communication of UE and achieving the effect of saving power of UE.

The specific implementation process of the data transmission method according to the embodiment of the present disclosure is described in detail hereinafter with reference to FIG. 4 to FIG. 14.

As shown in FIG. 4 to FIG. 10, in a slot structure, the SFI is transmitted once in a period of five slots. When UE receives one SFI, it will notify the slot structure (of which contents include: allocation of uplink and downlink resources, the number of symbols for uplink, the number of symbols for downlink and the number of symbols which are unknown, in each slot) of 5 consecutive slots. As shown in FIG. 4 to FIG. 10, starting with slot0, if the UE is configured to have SPS PDSCH transmission occasion starting from slot1 with a cycle of 5 slots, then there is SPS PDSCH transmission occasion in slot1, slot5, slot 9 . . .

Figure 4:
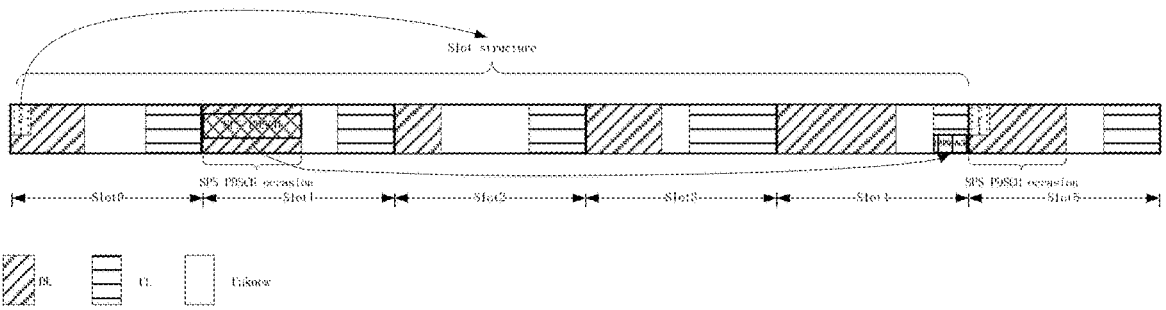
FIG. 4 to FIG. 14 are schematic diagrams of slot structures of a data transmission method according to an embodiment of the present disclosure.
Figure 5:
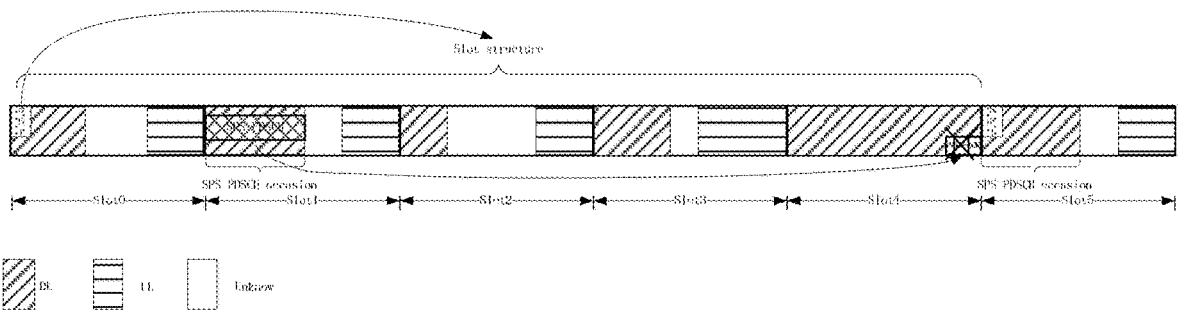
Figure 6:
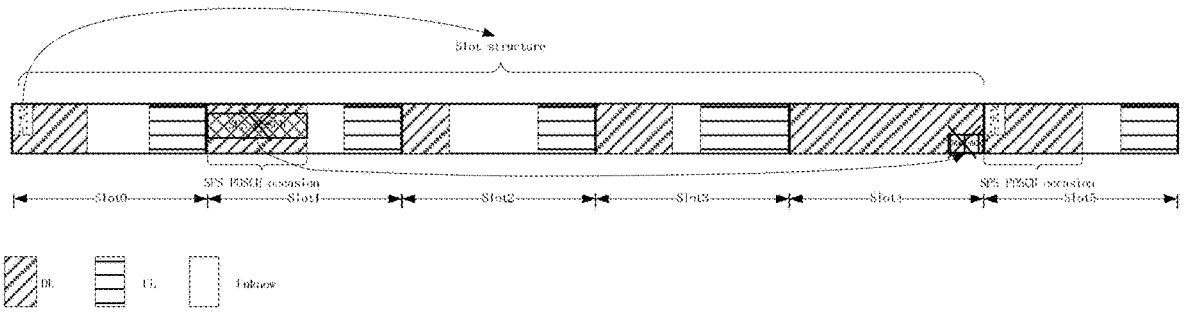

In the first implementation mode, when the UE detects an SFI in slot0 and the SFI indicates that all symbols of slot1 or symbols occupied by SPS PDSCH in slot1 are downlink or unknown (i.e., meeting requirements of transmission related to downlink SPS transmission), the UE receives SPS PDSCH in slot1 according to scheduling information in PDCCH for indicating activation of the SPS PDSCH. Further, if HARQ-ACK feedback of the SPS PDSCH is transmitted in slot4 (for example, feedback position and corresponding feedback resources may be determined according to HARQ-ACK timing indication field in the PDCCH for indicating activation of the SPS PDSCH, or, feedback position and corresponding feedback resources may be determined according to pre-agreement or configuration), then according to determined resources (time-domain position and frequency-domain resource), the UE transmits in slot4 the HARQ-ACK for the SPS PDSCH (at this point, SFI should not change the time-domain resource for transmitting HARQ-ACK in slot4 to be downlink), as shown in FIG. 4. Or, when the SFI indicates that all symbols of slot4 or position of time-domain resource in slot4 for transmitting HARQ-ACK for the SPS PDSCH in slot1, is downlink (i.e., not meeting requirements of transmission related to downlink SPS transmission), then the UE does not perform HARQ-ACK feedback of the SPS PDSCH in slot4, as shown in FIG. 5. Further, since the UE can determine before slot1 that the HARQ-ACK feedback of the SPS PDSCH in slot1 cannot be performed in slot4, then the terminal may not receive the SPS PDSCH in slot 1, thereby saving power consumption.

Figure 7:
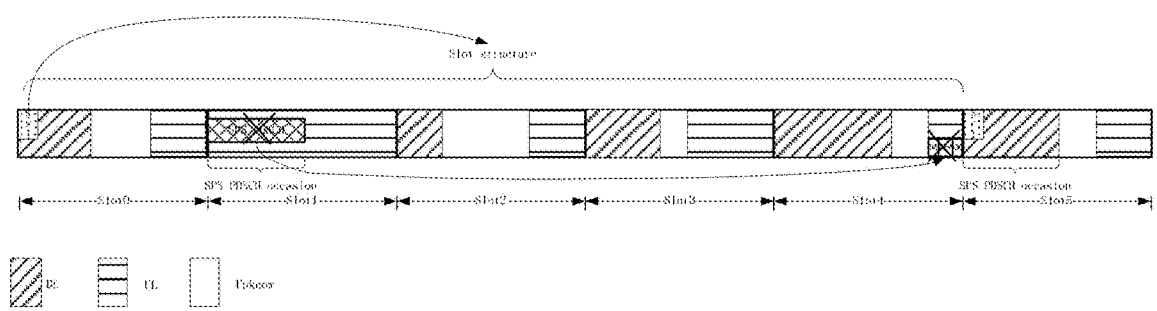
Figure 8:
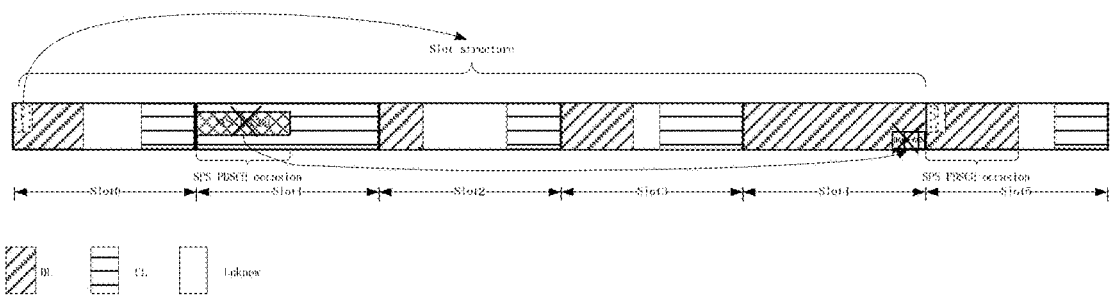
Figure 9:
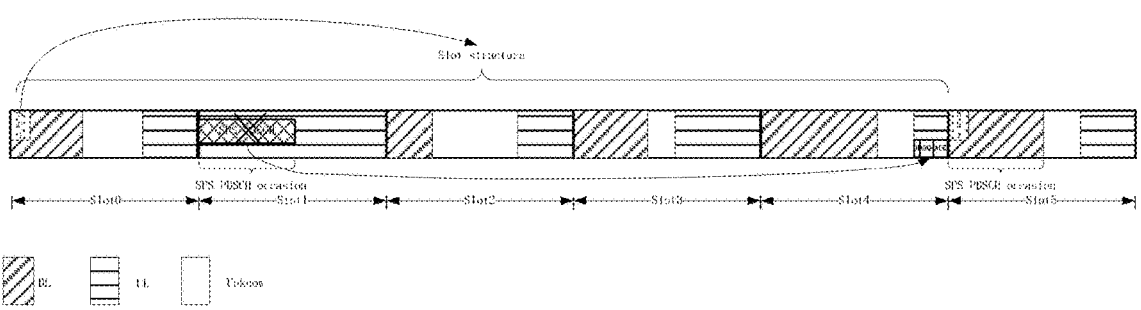

In the second implementation mode, when the UE detects an SFI in slot0 and the SFI indicates that all symbols of slot1 or symbols occupied by SPS PDSCH in slot1 are uplink (i.e., not meeting requirements of transmission related to downlink SPS transmission), the UE does not receive SPS PDSCH in slot1, thereby saving power consumption. Further it is assumed that HARQ-ACK feedback of the SPS PDSCH is transmitted in slot4, in slot4, the UE does not perform the HARQ-ACK feedback for the SPS PDSCH (no matter what kind of uplink and downlink allocation is assigned by SFI to slot4) because the UE itself does not receive the SPS PDSCH, thereby further saving power consumption, as shown in FIG. 7. Or, when the SFI indicates that all symbols of slot4 or position of time-domain resource in slot4 for transmitting HARQ-ACK for the SPS PDSCH in slot1, is downlink (i.e., not meeting requirements of transmission related to downlink SPS transmission), then the UE does not perform HARQ-ACK feedback of the SPS PDSCH in slot4, as shown in FIG. 8. When the SFI indicates that all symbols of slot4 or position of time-domain resource in slot4 for transmitting HARQ-ACK for the SPS PDSCH in slot1, is uplink or unknown (i.e., meeting requirements of transmission related to downlink SPS transmission), then in slot4, the UE performs HARQ-ACK feedback of the SPS PDSCH, generates NACK as feedback information for SPS PDSCH HARQ-ACK, and transmits the HARQ-ACK for the SPS PDSCH according to determined resources (time-domain position and frequency-domain resource), as shown in FIG. 9.

As shown in FIG. 10 to FIG. 14, in another slot structure, SFI is transmitted once in a period of one slot. When UE receives one SFI, it will notify structure (for example, which includes: allocation of uplink and downlink resources, the number of symbols for downlink, the number of symbols for uplink and the number of symbols which are unknown, in the slot) of the slot where the SFI transmission is located. As shown in FIG. 10 to FIG. 14, the UE is configured to have SPS PDSCH transmission occasion starting from slot1 with a cycle of 5 slots, then there is SPS PDSCH transmission occasion in slot1, slot5, slot 9 . . .

Figure 10:
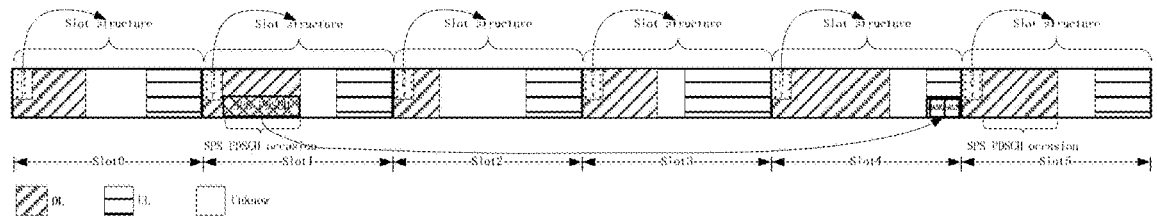
Figure 11:
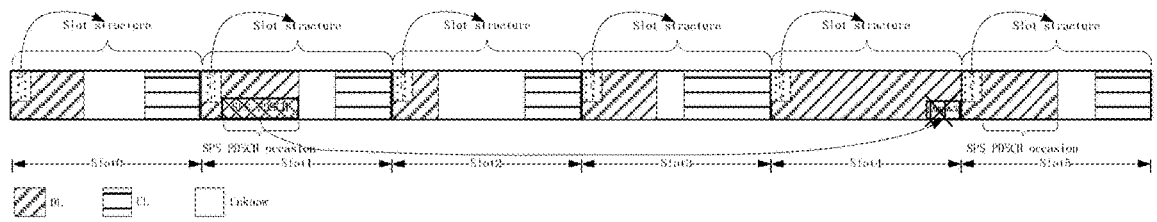

In the third implementation mode, when the UE detects an SFI in slot1 and the SFI indicates that all symbols of slot1 or symbols occupied by SPS PDSCH in slot1 are downlink or unknown (i.e., meeting requirements of transmission related to downlink SPS transmission), the UE receives SPS PDSCH in slot1 according to scheduling information in PDCCH for indicating activation of the SPS PDSCH. Further, if HARQ-ACK feedback of the SPS PDSCH is transmitted in slot4, then according to determined resources (time-domain position and frequency-domain resource), the UE transmits in slot4 the HARQ-ACK for the SPS PDSCH (at this point, SFI should not change the time-domain resource for transmitting HARQ-ACK in slot4 to be downlink), as shown in FIG. 10. Or, when the SFI indicates that all symbols of slot4 or position of time-domain resource in slot4 for transmitting HARQ-ACK for the SPS PDSCH in slot1, is downlink (i.e., not meeting requirements of transmission related to downlink SPS transmission), then the UE does not perform HARQ-ACK feedback of the SPS PDSCH in slot4, as shown in FIG. 11. Since when in slot1, the UE cannot determine whether the HARQ-ACK feedback of the SPS PDSCH can be performed in slot4, the UE can only determine whether to receive the SPS PDSCH according to resources indicated in slot1.

Figure 12:
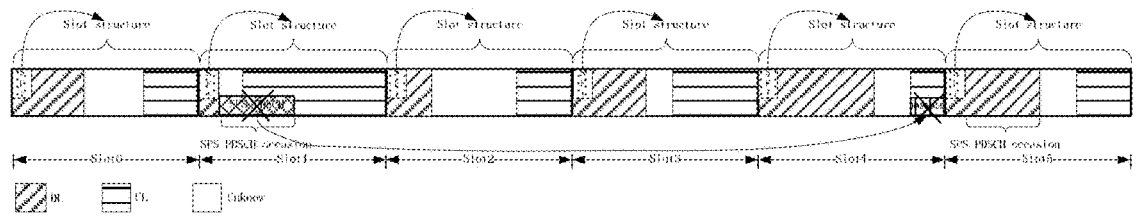
Figure 13:
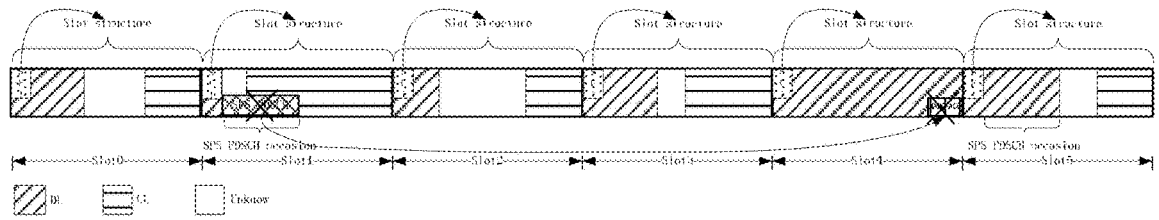
Figure 14:
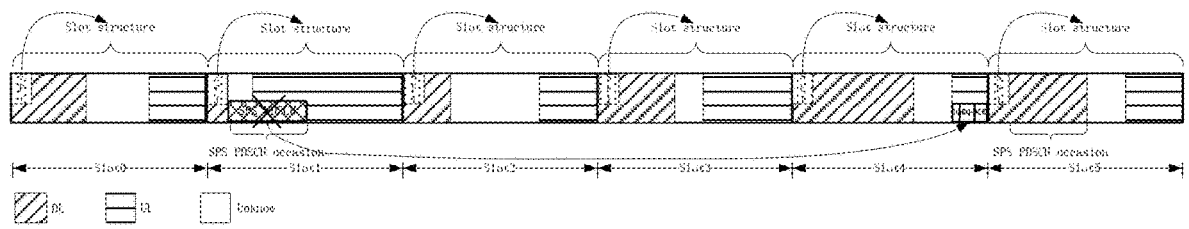

In the fourth implementation mode, when the UE detects an SFI in slot1 and the SFI indicates that all symbols of slot1 or symbols occupied by SPS PDSCH in slot1 are uplink (i.e., not meeting requirements of transmission related to downlink SPS transmission), the UE does not receive SPS PDSCH in slot1, thereby saving power consumption. Further, if HARQ-ACK feedback of the SPS PDSCH is transmitted in slot4, then in slot4, the UE does not perform the HARQ-ACK feedback for the SPS PDSCH (no matter what kind of uplink and downlink allocation is assigned by SFI to slot4) because the UE itself does not receive the SPS PDSCH, thereby further saving power consumption, as shown in FIG. 12. Or, when the SFI indicates that all symbols of slot4 or position of time-domain resource in slot4 for transmitting HARQ-ACK for the SPS PDSCH in slot1, is downlink (i.e., not meeting requirements of transmission related to downlink SPS transmission), then the UE does not perform HARQ-ACK feedback of the SPS PDSCH in slot4, as shown in FIG. 13. When the SFI indicates that all symbols of slot4 or position of time-domain resource in slot4 for transmitting HARQ-ACK for the SPS PDSCH in slot1, is uplink or unknown (i.e., meeting requirements of transmission related to downlink SPS transmission), then in slot4, the UE performs HARQ-ACK feedback of the SPS PDSCH, generates NACK as feedback information for SPS PDSCH HARQ-ACK, and transmits the HARQ-ACK for the SPS PDSCH according to determined resources (time-domain position and frequency-domain resource), as shown in FIG. 14.

Fourth Embodiment

Figure 15:
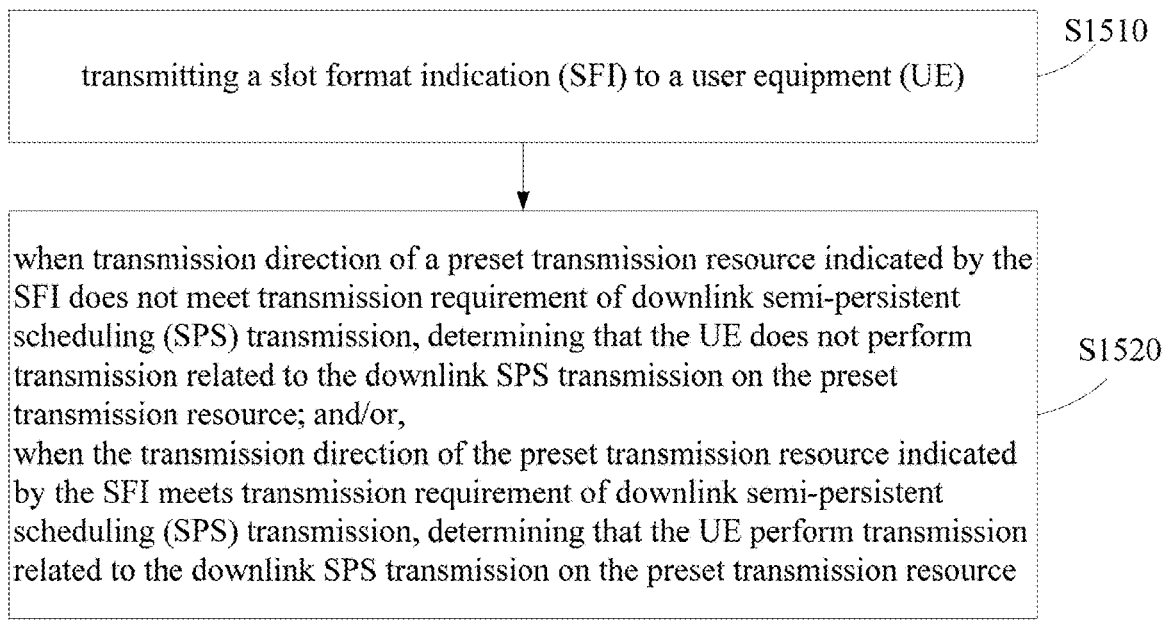
FIG. 15 is a flowchart of a data transmission method according to a fourth embodiment of the present disclosure.

Referring to FIG. 15, a data transmission method according to a fourth embodiment of the present disclosure, which is applied to a base station. As shown in FIG. 15, the method includes:

S1510: transmitting a slot format indication (SFI) to a user equipment (UE);

S1520: when transmission direction of a preset transmission resource indicated by the SFI does not meet transmission requirement of downlink semi-persistent scheduling (SPS) transmission, determining that the UE does not perform transmission related to the downlink SPS transmission on the preset transmission resource; and/or, when the transmission direction of the preset transmission resource indicated by the SFI meets transmission requirement of downlink semi-persistent scheduling (SPS) transmission, determining that the UE perform transmission related to the downlink SPS transmission on the preset transmission resource.

The preset transmission resource is a resource used for performing transmission related to the downlink SPS transmission.

Specifically, in the step S1520, transmission direction of the preset transmission resource indicated by the SFI not meeting transmission requirement of the downlink SPS transmission specifically includes:

when transmission direction of the preset transmission resource indicated by the SFI is uplink, determining that the transmission direction of the preset transmission resource indicated by the SFI does not meet the transmission requirement of the downlink SPS transmission, where the preset transmission resource is a resource used for downlink SPS PDSCH transmission; and/or, when transmission direction of the preset transmission resource indicated by the SFI is downlink, determining that the transmission direction of the preset transmission resource indicated by the SFI does not meet the transmission requirement of the downlink SPS transmission, where the preset transmission resource is a resource used for hybrid automatic repeat request-acknowledgement (HARQ-ACK) transmission corresponding to the downlink SPS PDSCH transmission.

In another aspect of the specific embodiment of the present disclosure, in the step S1520, transmission direction of the preset transmission resource indicated by the SFI meeting transmission requirement of the downlink SPS transmission specifically includes:

when transmission direction of the preset transmission resource indicated by the SFI is downlink or unknown, determining that the transmission direction of the preset transmission resource indicated by the SFI meets the transmission requirement of the downlink SPS transmission, where the preset transmission resource is a resource used for downlink SPS PDSCH transmission; and/or, when transmission direction of the preset transmission resource indicated by the SFI is uplink or unknown, determining that the transmission direction of the preset transmission resource indicated by the SFI meets the transmission requirement of the downlink SPS transmission, where the preset transmission resource is a resource used for hybrid automatic repeat request-acknowledgement (HARQ-ACK) transmission corresponding to the downlink SPS PDSCH transmission.

In the step S1520, determining that the UE does not perform transmission related to the downlink SPS transmission on the preset transmission resource, includes: determining that the UE does not receive downlink SPS PDSCH transmission.

Further, determining that the UE does not perform transmission related to the downlink SPS transmission on the preset transmission resource, includes: determining that the UE does not perform the HARQ-ACK transmission corresponding to the downlink SPS PDSCH transmission.

In addition, the method further includes:

when the resource used for HARQ-ACK transmission corresponding to the downlink SPS PDSCH transmission, indicated by the SFI, is uplink or unknown, determining that the UE performs HARQ-ACK transmission corresponding to the downlink SPS PDSCH transmission with feedback information of NACK.

In a specific embodiment of the present disclosure, the step of determining that the UE performs transmission related to the downlink SPS transmission on the preset transmission resource, includes:

determining that the UE receives downlink SPS PDSCH transmission; and/or, determining that the UE performs the HARQ-ACK transmission corresponding to the downlink SPS PDSCH transmission.

Fifth Embodiment

Figure 16:
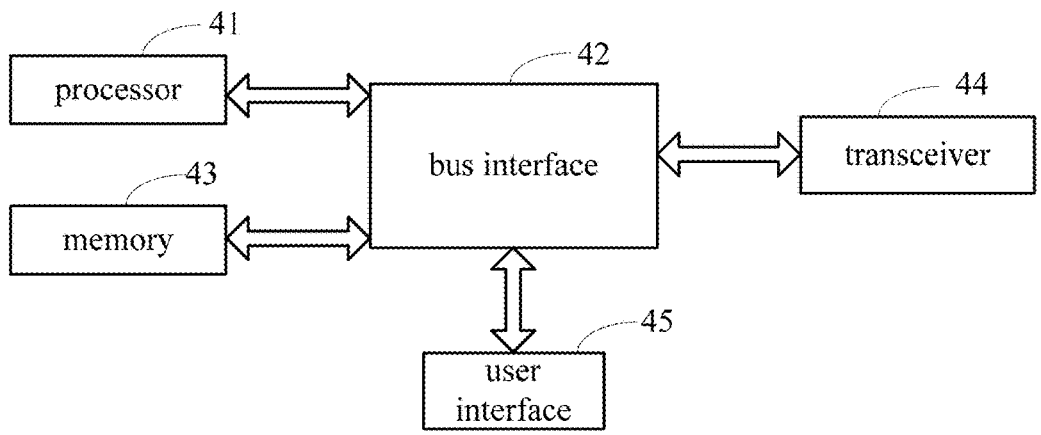
FIG. 16 is a schematic diagram of a user equipment according to a fifth embodiment of the present disclosure.

In order to better achieve the above object, referring to FIG. 16, a user equipment (UE) is provided in a fifth embodiment of the present disclosure and includes: a processor 41 and a memory 43 coupled with the processor 41 through a bus interface 42. The memory 43 is used to store programs and data used by the processor 41 when performing operations. When the processor 41 calls and executes the programs and data stored in the memory 43, the following procedures are performed.

A transceiver 44 is coupled with the bus interface 42 and used for receiving and transmitting data under the control of the processor 41. Specifically, the transceiver 44 is used to:

obtain a slot format indication (SFI) transmitted by a base station;

when transmission direction of a preset transmission resource indicated by the SFI does not meet transmission requirement of downlink semi-persistent scheduling (SPS) transmission, not perform transmission related to the downlink SPS transmission on the preset transmission resource; and/or, when transmission direction of the preset transmission resource indicated by the SFI meets transmission requirement of downlink semi-persistent scheduling (SPS) transmission, perform transmission related to the downlink SPS transmission on the preset transmission resource.

The preset transmission resource is a resource used for performing transmission related to the downlink SPS transmission.

The transmission direction of the preset transmission resource indicated by the SFI not meeting transmission requirement of the downlink SPS transmission specifically includes:

when transmission direction of the preset transmission resource indicated by the SFI is uplink, determining that the transmission direction of the preset transmission resource indicated by the SFI does not meet the transmission requirement of the downlink SPS transmission, where the preset transmission resource is a resource used for downlink SPS PDSCH transmission; and/or, when transmission direction of the preset transmission resource indicated by the SFI is downlink, determining that the transmission direction of the preset transmission resource indicated by the SFI does not meet the transmission requirement of the downlink SPS transmission, where the preset transmission resource is a resource used for hybrid automatic repeat request-acknowledgement (HARQ-ACK) transmission corresponding to the downlink SPS PDSCH transmission.

The transmission direction of the preset transmission resource indicated by the SFI meeting transmission requirement of the downlink SPS transmission specifically includes:

when transmission direction of the preset transmission resource indicated by the SFI is downlink or unknown, determining that the transmission direction of the preset transmission resource indicated by the SFI meets the transmission requirement of the downlink SPS transmission, where the preset transmission resource is a resource used for downlink SPS PDSCH transmission; and/or, when transmission direction of the preset transmission resource indicated by the SFI is uplink or unknown, determining that the transmission direction of the preset transmission resource indicated by the SFI meets the transmission requirement of the downlink SPS transmission, where the preset transmission resource is a resource used for hybrid automatic repeat request-acknowledgement (HARQ-ACK) transmission corresponding to the downlink SPS PDSCH transmission.

In addition, the step that the transceiver 44 does not perform transmission related to the downlink SPS transmission on the preset transmission resource, includes: not receiving downlink SPS PDSCH transmission.

Further, the step that the transceiver 44 does not perform transmission related to the downlink SPS transmission on the preset transmission resource, further includes: not performing the HARQ-ACK transmission corresponding to the downlink SPS PDSCH transmission.

In the UE according to a specific embodiment of the present disclosure, the transceiver 44 is also used to:

when the resource used for HARQ-ACK transmission corresponding to the downlink SPS PDSCH transmission, indicated by the SFI, is uplink or unknown, performing HARQ-ACK transmission corresponding to the downlink SPS PDSCH transmission with feedback information of NACK.

In a specific embodiment of the present disclosure, when determining that the transmission direction of the preset transmission resource indicated by the SFI does not meet the transmission requirement of the downlink SPS transmission, the step that the transceiver 44 performs transmission related to the downlink SPS transmission on the preset transmission resource, includes:

receiving downlink SPS PDSCH transmission; and/or, performing the HARQ-ACK transmission corresponding to the downlink SPS PDSCH transmission.

In embodiments of the present disclosure, the execution condition for the UE performing the above data transmission methods is that: after UE receives PDCCH for indicating activation of downlink SPS transmission, or after UE receives PDCCH for indicating activation of downlink SPS transmission until UE receives PDCCH for indicating release of the downlink SPS transmission.

It should be noted that, In FIG. 16, a bus architecture may include any number of interconnected buses and bridges. Specifically, various circuits of one or more processors, which are represented by the processor 41, and the storage, which is represented by the memory 43, are linked together. The bus architecture may link various other circuits, such as a peripheral device, voltage regulator and a power management circuit together. These features are well known in this field, therefore, this disclosure does not make further description on these features. The bus interface provides an interface. The transceiver 44 may be multiple elements, including a transmitter and a receiver and provide units, which communicate with other devices on the transmission medium. For different UEs, a user interface 45 may also be an interface capable of externally/internally connecting required devices which may include a keyboard, a monitor, a speaker, microphone, joystick. The processor 41 is responsible for managing the bus architecture and common processing and the memory 43 may store data used by the processor 41 when executing the operations.

Those skilled in the art can understand that all or some of the steps of the above embodiments may be implemented by hardware, or may be implemented by using a computer program to instruct related hardware. The computer program includes instructions to perform some or all steps of the above method. The computer program may be stored in a readable storage medium, and the storage medium may be any form of storage medium.

Sixth Embodiment

Figure 17:
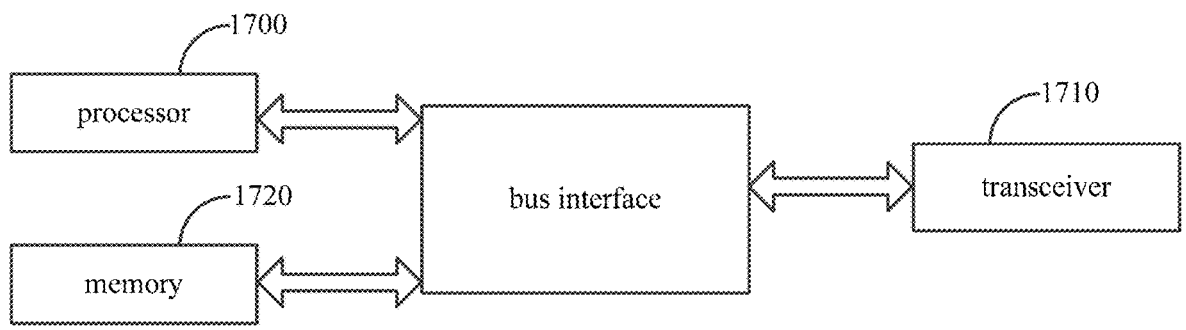
FIG. 17 is a schematic diagram of a base station according to a sixth embodiment of the present disclosure.

As shown in FIG. 17, a base station is provided in a sixth embodiment of the present disclosure and includes: a processor 1700; a memory 1720 coupled with the processor 1700 through a bus interface; and a transceiver 1710 coupled with the processor 1700 through the bus interface. The memory 1720 is used to store programs and data used by the processor in performing operations. The transceiver 1710 is used to transmit data information or pilot. The transceiver 1710 is further used to receive uplink control channel. The processor 1700 is used to read the program in the memory 1720 to perform the following procedures.

The transceiver 1710 is used for receiving and transmitting data under the control of the processor 1700. Specifically, the transceiver 1710 is used to transmit a slot format indication (SFI) to a user equipment (UE).

The processor 1700 is used to, when transmission direction of a preset transmission resource indicated by the SFI does not meet transmission requirement of downlink semi-persistent scheduling (SPS) transmission, determine that the UE does not perform transmission related to the downlink SPS transmission on the preset transmission resource; and/or, when the transmission direction of the preset transmission resource indicated by the SFI meets transmission requirement of downlink semi-persistent scheduling (SPS) transmission, determine that the UE perform transmission related to the downlink SPS transmission on the preset transmission resource.

The preset transmission resource is a resource used for performing transmission related to the downlink SPS transmission.

Specifically, the processor 1700 is specifically used to, when transmission direction of the preset transmission resource indicated by the SFI is uplink, determine that the transmission direction of the preset transmission resource indicated by the SFI does not meet the transmission requirement of the downlink SPS transmission, where the preset transmission resource is a resource used for downlink SPS PDSCH transmission; and/or, when transmission direction of the preset transmission resource indicated by the SFI is downlink, determine that the transmission direction of the preset transmission resource indicated by the SFI does not meet the transmission requirement of the downlink SPS transmission, where the preset transmission resource is a resource used for hybrid automatic repeat request-acknowledgement (HARQ-ACK) transmission corresponding to the downlink SPS PDSCH transmission.

In addition, the processor 1700 is specifically used to, when transmission direction of the preset transmission resource indicated by the SFI is downlink or unknown, determine that the transmission direction of the preset transmission resource indicated by the SFI meets the transmission requirement of the downlink SPS transmission, where the preset transmission resource is a resource used for downlink SPS PDSCH transmission; and/or, when transmission direction of the preset transmission resource indicated by the SFI is uplink or unknown, determine that the transmission direction of the preset transmission resource indicated by the SFI meets the transmission requirement of the downlink SPS transmission, where the preset transmission resource is a resource used for hybrid automatic repeat request-acknowledgement (HARQ-ACK) transmission corresponding to the downlink SPS PDSCH transmission.

The processor 1700 determines that the UE does not perform transmission related to the downlink SPS transmission on the preset transmission resource in way including: determining that the UE does not receive downlink SPS PDSCH transmission.

Further, the processor 1700 determines that the UE does not perform transmission related to the downlink SPS transmission on the preset transmission resource in way including: determining that the UE does not perform the HARQ-ACK transmission corresponding to the downlink SPS PDSCH transmission.

Further, the processor 1700 is further used to, when the resource used for HARQ-ACK transmission corresponding to the downlink SPS PDSCH transmission, indicated by the SFI, is uplink or unknown, determine that the UE performs HARQ-ACK transmission corresponding to the downlink SPS PDSCH transmission with feedback information of NACK.

In another aspect of an embodiment of the present disclosure, the processor 1700 determines that the UE performs transmission related to the downlink SPS transmission on the preset transmission resource in way including:

determining that the UE receives downlink SPS PDSCH transmission; and/or, determining that the UE performs the HARQ-ACK transmission corresponding to the downlink SPS PDSCH transmission.

In addition, In FIG. 17, a bus architecture may include any number of interconnected buses and bridges. Specifically, various circuits of one or more processors, which are represented by the processor 1700, and the storage, which is represented by the memory 1720, are linked together. The bus architecture may link various other circuits, such as a peripheral device, voltage regulator and a power management circuit together. These features are well known in this field, therefore, this disclosure does not make further description on these features. The bus interface provides an interface. The transceiver 1710 may be multiple elements, including a transmitter and a receiver and provide units, which communicate with other devices on the transmission medium. The processor 1700 is responsible for managing the bus architecture and common processing and the memory 1720 may store data used by the processor 1700 when executing the operations.

Those skilled in the art can understand that all or some of the steps of the above embodiments may be implemented by hardware, or may be implemented by using a computer program to instruct related hardware. The computer program includes instructions to perform some or all steps of the above method. The computer program may be stored in a readable storage medium, and the storage medium may be any form of storage medium.

Seventh Embodiment

Figure 18:
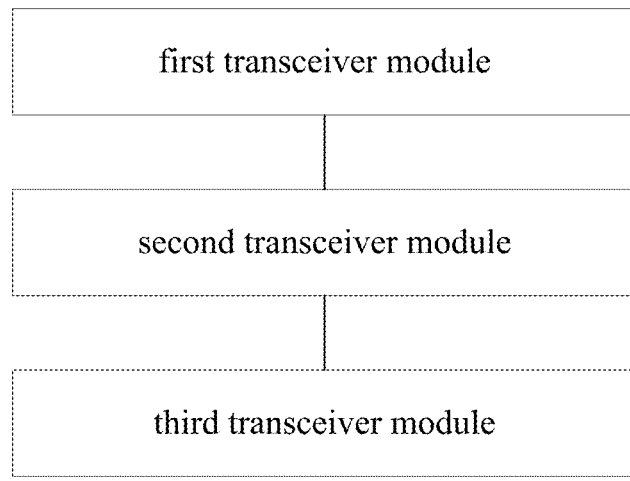
FIG. 18 is a schematic diagram of a user equipment according to a seventh embodiment of the present disclosure.

Referring to FIG. 18, a user equipment (UE) is provided according to an embodiment of the present disclosure and includes:

a first transceiver module used to obtain a slot format indication (SFI) transmitted by a base station;

a second transceiver module used to, when transmission direction of a preset transmission resource indicated by the SFI does not meet transmission requirement of downlink semi-persistent scheduling (SPS) transmission, not perform transmission related to the downlink SPS transmission on the preset transmission resource; and/or, a third transceiver module used to, when transmission direction of the preset transmission resource indicated by the SFI meets transmission requirement of downlink semi-persistent scheduling (SPS) transmission, perform transmission related to the downlink SPS transmission on the preset transmission resource.

The preset transmission resource is a resource used for performing transmission related to the downlink SPS transmission.

Specifically, the transmission direction of the preset transmission resource indicated by the SFI not meeting transmission requirement of the downlink SPS transmission specifically includes:

when transmission direction of the preset transmission resource indicated by the SFI is uplink, determining that the transmission direction of the preset transmission resource indicated by the SFI does not meet the transmission requirement of the downlink SPS transmission, where the preset transmission resource is a resource used for downlink SPS PDSCH transmission; and/or, when transmission direction of the preset transmission resource indicated by the SFI is downlink, determining that the transmission direction of the preset transmission resource indicated by the SFI does not meet the transmission requirement of the downlink SPS transmission, where the preset transmission resource is a resource used for hybrid automatic repeat request-acknowledgement (HARQ-ACK) transmission corresponding to the downlink SPS PDSCH transmission.

According to another aspect of the UE described in the specific embodiments of the present disclosure, the transmission direction of the preset transmission resource indicated by the SFI meeting transmission requirement of the downlink SPS transmission specifically includes:

when transmission direction of the preset transmission resource indicated by the SFI is downlink or unknown, determining that the transmission direction of the preset transmission resource indicated by the SFI meets the transmission requirement of the downlink SPS transmission, where the preset transmission resource is a resource used for downlink SPS PDSCH transmission; and/or, when transmission direction of the preset transmission resource indicated by the SFI is uplink or unknown, determining that the transmission direction of the preset transmission resource indicated by the SFI meets the transmission requirement of the downlink SPS transmission, where the preset transmission resource is a resource used for hybrid automatic repeat request-acknowledgement (HARQ-ACK) transmission corresponding to the downlink SPS PDSCH transmission.

Specifically, the step that the second transceiver module does not perform transmission related to the downlink SPS transmission on the preset transmission resource, includes: not receiving downlink SPS PDSCH transmission.

In addition, the step that the second transceiver module does not perform transmission related to the downlink SPS transmission on the preset transmission resource, further includes: not performing the HARQ-ACK transmission corresponding to the downlink SPS PDSCH transmission.

In addition, the second transceiver module is further used to:

when the resource used for HARQ-ACK transmission corresponding to the downlink SPS PDSCH transmission, indicated by the SFI, is uplink or unknown, performing HARQ-ACK transmission corresponding to the downlink SPS PDSCH transmission with feedback information of NACK.

In a specific embodiment of the present disclosure, the step that the third transceiver module performs transmission related to the downlink SPS transmission on the preset transmission resource, includes:

receiving downlink SPS PDSCH transmission; and/or, performing the HARQ-ACK transmission corresponding to the downlink SPS PDSCH transmission.

In embodiments of the present disclosure, the execution condition for the UE performing the above data transmission method is that: after UE receives PDCCH for indicating activation of downlink SPS transmission, or after UE receives PDCCH for indicating activation of downlink SPS transmission until UE receives PDCCH for indicating release of the downlink SPS transmission.

Eighth Embodiment

Figure 19:
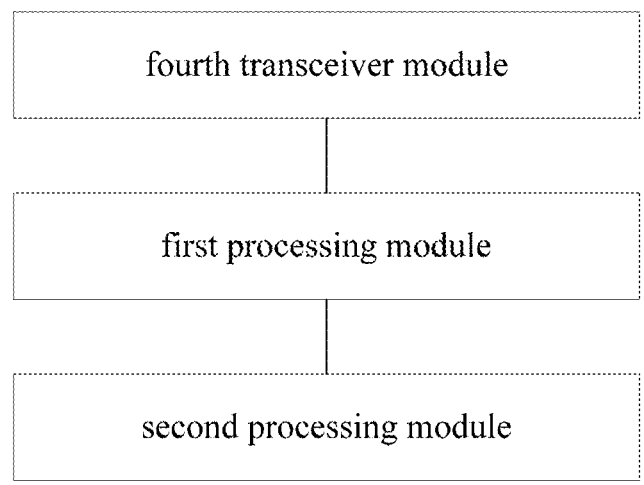
FIG. 19 is a schematic diagram of a base station according to an eighth embodiment of the present disclosure.

Referring to FIG. 19, a base station is provided according to an embodiment of the present disclosure and includes:

a fourth transceiver module used to transmit a slot format indication (SFI) to a user equipment (UE);

a first processing module used to, when transmission direction of a preset transmission resource indicated by the SFI does not meet transmission requirement of downlink semi-persistent scheduling (SPS) transmission, determine that the UE does not perform transmission related to the downlink SPS transmission on the preset transmission resource; and/or, a second processing module used to, when the transmission direction of the preset transmission resource indicated by the SFI meets transmission requirement of downlink semi-persistent scheduling (SPS) transmission, determine that the UE perform transmission related to the downlink SPS transmission on the preset transmission resource.

The preset transmission resource is a resource used for performing transmission related to the downlink SPS transmission.

The first processing module is further used to, when transmission direction of the preset transmission resource indicated by the SFI is uplink, determine that the transmission direction of the preset transmission resource indicated by the SFI does not meet the transmission requirement of the downlink SPS transmission, where the preset transmission resource is a resource used for downlink SPS PDSCH transmission; and/or, when transmission direction of the preset transmission resource indicated by the SFI is downlink, determine that the transmission direction of the preset transmission resource indicated by the SFI does not meet the transmission requirement of the downlink SPS transmission, where the preset transmission resource is a resource used for hybrid automatic repeat request-acknowledgement (HARQ-ACK) transmission corresponding to the downlink SPS PDSCH transmission.

In addition, the first processing module is further used to, when transmission direction of the preset transmission resource indicated by the SFI is downlink or unknown, determine that the transmission direction of the preset transmission resource indicated by the SFI meets the transmission requirement of the downlink SPS transmission, where the preset transmission resource is a resource used for downlink SPS PDSCH transmission; and/or, when transmission direction of the preset transmission resource indicated by the SFI is uplink or unknown, determine that the transmission direction of the preset transmission resource indicated by the SFI meets the transmission requirement of the downlink SPS transmission, where the preset transmission resource is a resource used for hybrid automatic repeat request-acknowledgement (HARQ-ACK) transmission corresponding to the downlink SPS PDSCH transmission.

In addition, the first processing module determines that the UE does not perform transmission related to the downlink SPS transmission on the preset transmission resource in way including: determining that the UE does not receive downlink SPS PDSCH transmission.

Further, the first processing module determines that the UE does not perform transmission related to the downlink SPS transmission on the preset transmission resource in way including: determining that the UE does not perform the HARQ-ACK transmission corresponding to the downlink SPS PDSCH transmission.

Further, the first processing module is further used to, when the resource used for HARQ-ACK transmission corresponding to the downlink SPS PDSCH transmission, indicated by the SFI, is uplink or unknown, determine that the UE performs HARQ-ACK transmission corresponding to the downlink SPS PDSCH transmission with feedback information of NACK.

In the base station of the specific embodiment of the present disclosure, the second processing module determines that the UE performs transmission related to the downlink SPS transmission on the preset transmission resource in way including:

determining that the UE receives downlink SPS PDSCH transmission; and/or, determining that the UE performs the HARQ-ACK transmission corresponding to the downlink SPS PDSCH transmission.

Another aspect of the present disclosure further provides a computer readable storage medium. The computer readable storage medium includes a computer program stored thereon. The computer program is executed by a processor to implement steps of the above data transfer method.

Based on the above description, those skilled in the art should understand the specific structure of the computer readable storage medium that performs the data transmission method of the present disclosure, and will not be described in detail herein.

The data transmission method, the UE, the base station and the computer readable storage medium according to the embodiments of the present disclosure clearly define the data transmission mode when a direction of a resource corresponding to downlink SPS transmission determined by the SFI does not meet requirement of the downlink SPS transmission and/or meets the requirement of the downlink SPS transmission, thereby solving the problem of data transmission when the base station simultaneously configures the slot format indication (SFI) and the downlink semi-persistent scheduling (SPS) physical downlink shared channel (PDSCH) transmission, and then ensuring normal communication of UE and achieving the effect of saving power of UE.

In addition, it should be noted that in the apparatus and method of the present disclosure, it is apparent that each component or each step may be decomposed and/or recombined. These decompositions and/or recombination should be regarded as equivalent solutions of the present disclosure. Further, steps of performing the above series of procedures may be performed in time sequence according to the description, but they do not need to be performed in time sequence, and some steps may be performed simultaneously or independently of each other. Those of ordinary skill in the art can understand that all or any step or component of the methods and devices of the present disclosure, may be implemented by hardware, firmware, software or a combination thereof, in any computing device (including a processor, a storage medium, etc.) or network of computing devices, which may be achieved by those of ordinary skill in the art with their basic programming skills after reading the description of the present disclosure.

Accordingly, the objects of the present disclosure may also be realized by running a program or a set of programs on any computing device. The computing device may be a well-known general-purpose device. Therefore, the objects of the present disclosure may also be realized by a program product including program codes for implementing the method or apparatus. That is to say, such program product also constitutes the present disclosure, and a storage medium storing such program product also constitutes the present disclosure. It will be apparent that the storage medium may be any known storage medium or any storage medium developed in the future. It should also be noted that in the apparatus and method of the present disclosure, it is apparent that various components or steps may be decomposed and/or recombined. These decompositions and/or recombination should be considered as equivalents to the present disclosure. Also, steps of performing the above series of procedures may be performed in time sequence according to the description, but they do not need to be performed in time sequence, and some steps may be performed simultaneously or independently of each other.

The above are merely the preferred embodiments of the present disclosure. It should be noted that, a person skilled in the art may make improvements and modifications without departing from the principle of the present disclosure, and these improvements and modifications shall also fall within the scope of the present disclosure.

What is claimed is:

1. A data transmission method applied to a user equipment (UE), comprising:
obtaining a slot format indication (SFI) transmitted by a base station;
when a transmission direction of a preset transmission resource indicated by the SFI does not meet transmission requirement of downlink semi-persistent scheduling (SPS) transmission, not performing the transmission related to the downlink SPS transmission on the preset transmission resource; and/or,
when the transmission direction of the preset transmission resource indicated by the SFI meets transmission requirement of the downlink semi-persistent scheduling (SPS) transmission, performing the transmission related to the downlink SPS transmission on the preset transmission resource;
wherein the preset transmission resource is a resource for performing transmission related to the downlink SPS transmission;
wherein the transmission direction of the preset transmission resource indicated by the SFI not meeting transmission requirement of the downlink SPS transmission specifically includes at least one of:
when the transmission direction of the preset transmission resource indicated by the SFI is uplink, determining that the transmission direction of the preset transmission resource indicated by the SFI does not meet transmission requirement of the downlink SPS transmission, wherein the preset transmission resource is a resource for downlink SPS PDSCH transmission;
when the transmission direction of the preset transmission resource indicated by the SFI is downlink, determining that the transmission direction of the preset transmission resource indicated by the SFI does not meet transmission requirement of the downlink SPS transmission, wherein the preset transmission resource is a resource for hybrid automatic repeat request-acknowledgement (HARQ-ACK) transmission corresponding to the downlink SPS Physical Downlink Shared Channel (PDSCH) transmission;
wherein the transmission direction of the preset transmission resource indicated by the SFI meeting transmission requirement of the downlink SPS transmission specifically includes at least one of:
when the transmission direction of the preset transmission resource indicated by the SFI is downlink or unknown, determining that the transmission direction of the preset transmission resource indicated by the SFI meets transmission requirement of the downlink SPS transmission, wherein the preset transmission resource is a resource for downlink SPS PDSCH transmission;
when the transmission direction of the preset transmission resource indicated by the SFI is uplink or unknown, determining that the transmission direction of the preset transmission resource indicated by the SFI meets transmission requirement of the downlink SPS transmission, wherein the preset transmission resource is a resource for hybrid automatic repeat request-acknowledgement (HARQ-ACK) transmission corresponding to the downlink SPS PDSCH transmission.

2. The data transmission method according to claim 1, wherein the step of not performing the transmission related to the downlink SPS transmission on the preset transmission resource, includes at least one of:
not receiving the downlink SPS PDSCH transmission;
not performing the HARQ-ACK transmission corresponding to the downlink SPS PDSCH transmission.

3. The data transmission method according to claim 2, wherein when not receiving the downlink SPS PDSCH transmission, the method further includes:
when a resource for HARQ-ACK transmission corresponding to the downlink SPS PDSCH transmission, indicated by the SFI, is uplink or unknown, performing the HARQ-ACK transmission corresponding to the downlink SPS PDSCH transmission with feedback information of NACK.

4. The data transmission method according to claim 1, wherein the step of performing the transmission related to the downlink SPS transmission on the preset transmission resource, includes at least one of:
receiving the downlink SPS PDSCH transmission;
performing the HARQ-ACK transmission corresponding to the downlink SPS PDSCH transmission.

5. The data transmission method according to claim 1, wherein the method further includes an execution condition for performing the data transmission method, and the execution condition includes: after the UE receives a Physical Downlink Control Channel (PDCCH) for indicating activation of the downlink SPS transmission, or after the UE receives a PDCCH for indicating activation of the downlink SPS transmission until the UE correctly receives a PDCCH for indicating release of the downlink SPS transmission.

6. A data transmission method applied to a base station, comprising:
transmitting a slot format indication (SFI) to a user equipment (UE);
when a transmission direction of a preset transmission resource indicated by the SFI does not meet transmission requirement of downlink semi-persistent scheduling (SPS) transmission, determining that the UE does not perform the transmission related to the downlink SPS transmission on the preset transmission resource; and/or,
when the transmission direction of the preset transmission resource indicated by the SFI meets transmission requirement of the downlink semi-persistent scheduling (SPS) transmission, determining that the UE perform the transmission related to the downlink SPS transmission on the preset transmission resource;
wherein the preset transmission resource is a resource for performing transmission related to the downlink SPS transmission;
wherein the transmission direction of the preset transmission resource indica ted by the SFI not meeting transmission requirement of the downlink SPS transmission specifically includes at least one of:
when the transmission direction of the preset transmission resource indicated by the SFI is uplink, determining that the transmission direction of the preset trans mission resource indicated by the SFI does not meet transmission requirement of the downlink SPS transmission, wherein the preset transmission resource is a resource for downlink SPS PDSCH transmission;
when the transmission direction of the preset transmission resource indicated by the SFI is downlink, determining that the transmission direction of the preset transmission resource indicated by the SFI does not meet transmission requirement of the downlink SPS transmission, wherein the preset transmission resource is a resource for hybrid automatic repeat request-acknowledgement (HARQ-ACK) transmission corresponding to the downlink SPS PDSCH transmission:
wherein the transmission direction of the preset transmission resource indicated by the SFI meeting transmission requirement of the downlink SPS transmission specifically includes at least one of:
when the transmission direction of the preset transmission resource indicated by the SFI is downlink or unknown, determining that the transmission direction of the preset transmission resource indicated by the SFI meets transmission requirement of the downlink SPS transmission, wherein the preset transmission resource is a resource for downlink SPS PDSCH transmission;
when the transmission direction of the preset transmission resource indicated by the SFI is uplink or unknown, determining that the transmission direction of the preset transmission resource indicated by the SFI meets transmission requirement of the downlink SPS transmission, wherein the preset transmission resource is a resource for hybrid automatic repeat request-acknowledgement (HARQ-ACK) transmission corresponding to the downlink SPS PDSCH transmission.

7. The data transmission method according to claim 6, wherein the step of determining that the UE does not perform the transmission related to the downlink SPS transmission on the preset transmission resource, includes at least one of:
determining that the UE does not receive downlink SPS PDSCH transmission;
determining that the UE does not perform HARQ-ACK transmission corresponding to the downlink SPS PDSCH transmission.

8. The data transmission method according to claim 7, wherein when determining that the UE does not receive downlink SPS PDSCH transmission, the method further includes:
when a resource for HARQ-ACK transmission corresponding to the downlink SPS PDSCH transmission, indicated by the SFI, is uplink or unknown, determining that the UE performs HARQ-ACK transmission corresponding to the downlink SPS PDSCH transmission with feedback information of NACK.

9. The data transmission method according to claim 6, wherein the step of determining that the UE performs the transmission related to the downlink SPS transmission on the preset transmission resource, includes at least one of:
determining that the UE receives downlink SPS PDSCH transmission;
determining that the UE performs HARQ-ACK transmission corresponding to the downlink SPS PDSCH transmission.

10. The base station for performing the data transmission method according to claim 6, comprising: a transceiver, a memory, a processor, and a computer program stored on the memory and executable on the processor;
wherein the transceiver is configured to transmit the slot format indication (SFI) to the user equipment (UE);
the processor is configured to,
when the transmission direction of the preset transmission resource indicated by the SFI does not meet transmission requirement of the downlink semi-persistent scheduling (SPS) transmission, determine that the UE does not perform the transmission related to the downlink SPS transmission on the preset transmission resource; and/or,
when the transmission direction of the preset transmission resource indicated by the SFI meets transmission requirement of the downlink semi-persistent scheduling (SPS) transmission, determine that the UE perform the transmission related to the downlink SPS transmission on the preset transmission resource;
wherein the preset transmission resource is a resource for performing transmission related to the downlink SPS transmission;
wherein the processor is configured to,
when the transmission direction of the preset transmission resource indicated by the SFI is uplink, determine that the transmission direction of the preset transmission resource indicated by the SFI does not meet transmission requirement of the downlink SPS transmission, wherein the preset transmission resource is the resource for downlink SPS PDSCH transmission; and/or, when the transmission direction of the preset transmission resource indicated by the SFI is downlink, determine that the transmission direction of the preset transmission resource indicated by the SFI does not meet transmission requirement of the downlink SPS transmission, wherein the preset transmission resource is the resource for hybrid automatic repeat request-acknowledgement (HARQ-ACK) transmission corresponding to the downlink SPS PDSCH transmission:

wherein the processor is configured to, when the transmission direction of the preset transmission resource indicated by the SFI is downlink or unknown, determine that the transmission direction of the preset transmission resource indicated by the SFI meets transmission requirement of the downlink SPS transmission, wherein the preset transmission resource is the resource for downlink SPS PDSCH transmission; and/or, when the transmission direction of the preset transmission resource indicated by the SFI is uplink or unknown, determine that the transmission direction of the preset transmission resource indicated by the SFI meets transmission requirement of the downlink SPS transmission, wherein the preset transmission resource is the resource for hybrid automatic repeat request-acknowledgement (HARQ-ACK) transmission corresponding to the downlink SPS PDSCH transmission.

11. The base station according to claim 10, wherein when the processor determines that the UE does not perform the transmission related to the downlink SPS transmission on the preset transmission resource, the processor is specifically configured to, determine that the UE does not receive downlink SPS PDSCH transmission; and/or, determine that the UE does not perform HARQ-ACK transmission corresponding to the downlink SPS PDSCH transmission;

when the processor determines that the UE performs the transmission related to the downlink SPS transmission on the preset transmission resource, the processor is specifically configured to, determine that the UE receives the downlink SPS PDSCH transmission; and/or, determine that the UE performs the HARQ-ACK transmission corresponding to the downlink SPS PDSCH transmission.

12. The base station according to claim 11, wherein the processor is further configured to, when a resource for HARQ-ACK transmission corresponding to the downlink SPS PDSCH transmission, indicated by the SFI, is uplink or unknown, determine that the UE performs HARQ-ACK transmission corresponding to the downlink SPS PDSCH transmission with feedback information of NACK.

13. A user equipment (UE) comprising: a transceiver, a memory, a processor, and a computer program stored on the memory and executable on the processor; wherein the transceiver is configured to:

obtain a slot format indication (SFI) transmitted by a base station;

when a transmission direction of a preset transmission resource indicated by the SFI does not meet transmission requirement of downlink semi-persistent scheduling (SPS) transmission, not perform the transmission related to the downlink SPS transmission on the preset transmission resource; and/or, when the transmission direction of the preset transmission resource indicated by the SFI meets transmission requirement of the downlink semi-persistent scheduling (SPS) transmission, perform the transmission related to the downlink SPS transmission on the preset transmission resource;

wherein the preset transmission resource is a resource for performing transmission related to the downlink SPS transmission;

wherein the transmission direction of the preset transmission resource indicated by the SFI not meeting transmission requirement of the downlink SPS transmission specifically includes at least one of:

when the transmission direction of the preset transmission resource indicated by the SFI is uplink, determining that the transmission direction of the preset transmission resource indicated by the SFI does not meet transmission requirement of the downlink SPS transmission, wherein the preset transmission resource is a resource for downlink SPS PDSCH transmission;

when the transmission direction of the preset transmission resource indicated by the SFI is downlink, determining that the transmission direction of the preset transmission resource indicated by the SFI does not meet transmission requirement of the downlink SPS transmission, wherein the preset transmission resource is a resource for hybrid automatic repeat request-acknowledgement (HARQ-ACK) transmission corresponding to the downlink SPS PDSCH transmission:

wherein the transmission direction of the preset transmission resource indicated by the SFI meeting transmission requirement of the downlink SPS transmission specifically includes at least one of:

when the transmission direction of the preset transmission resource indicated by the SFI is downlink or unknown, determining that the transmission direction of the preset transmission resource indicated by the SFI meets transmission requirement of the downlink SPS transmission, wherein the preset transmission resource is a resource for downlink SPS PDSCH transmission;

when the transmission direction of the preset transmission resource indicated by the SFI is uplink or unknown, determining that the transmission direction of the preset transmission resource indicated by the SFI meets transmission requirement of the downlink SPS transmission, wherein the preset transmission resource is a resource for hybrid automatic repeat request-acknowledgement (HARQ-ACK) transmission corresponding to the downlink SPS PDSCH transmission.

14. The UE according to claim 13, wherein the step of the transceiver not performing the transmission related to the downlink SPS transmission on the preset transmission resource, includes at least one of:

not receiving the downlink SPS PDSCH transmission;

not performing the HARQ-ACK transmission corresponding to the downlink SPS PDSCH transmission;

wherein the step of the transceiver performing the transmission related to the downlink SPS transmission on the preset transmission resource, includes at least one of:

receiving the downlink SPS PDSCH transmission;

performing the HARQ-ACK transmission corresponding to the downlink SPS PDSCH transmission.

15. The UE according to claim 14, wherein when not receiving the downlink SPS PDSCH transmission, the transceiver is further configured to, when a resource for HARQ-ACK transmission corresponding to the downlink SPS PDSCH transmission, indicated by the SFI, is uplink or unknown, perform HARQ-ACK transmission corresponding to the downlink SPS PDSCH transmission with feedback information of NACK.

16. The UE according to claim 13, wherein an execution condition for the UE performing data transmission includes: after the UE receives PDCCH for indicating activation of downlink SPS transmission, or after UE receives PDCCH for indicating activation of downlink SPS transmission until UE receives PDCCH for indicating release of the downlink SPS transmission.

* * * * *